(12) United States Patent
Lim et al.

(10) Patent No.: US 12,203,536 B1
(45) Date of Patent: Jan. 21, 2025

(54) LINKAGE STRUCTURE AND UNIVERSAL DRIVING DEVICE USING SAME

(71) Applicants: HYUNDAI MOTOR COMPANY, Seoul (KR); KIA CORPORATION, Seoul (KR)

(72) Inventors: Woo Hyun Lim, Incheon (KR); Ki Seok Kim, Seongnam-si (KR); Kyoung Chul Min, Hwaseong-si (KR); Jong Sool Park, Hwaseong-si (KR); Dae In Lee, Anyang-si (KR); Yeo Hae Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/414,934

(22) Filed: Jan. 17, 2024

(30) Foreign Application Priority Data

Sep. 18, 2023 (KR) .......................... 10-2023-0124132

(51) Int. Cl.
| | |
|---|---|
| *F16H 1/28* | (2006.01) |
| *F16H 3/64* | (2006.01) |
| *F16H 3/78* | (2006.01) |
| *F16H 29/16* | (2006.01) |
| *F16H 57/00* | (2012.01) |
| *F16H 57/08* | (2006.01) |
| *F16H 61/04* | (2006.01) |

(52) U.S. Cl.
CPC ................. *F16H 3/78* (2013.01); *F16H 3/64* (2013.01); *F16H 29/16* (2013.01); *F16H 57/0025* (2013.01); *F16H 2001/2872* (2013.01); *F16H 57/082* (2013.01); *F16H 2061/0448* (2013.01)

(58) Field of Classification Search
CPC .......................... F16H 1/46; F16H 1/48; F16H 2001/2872–2001/2881; F16H 48/11; F16H 1/28–1/2818; F16H 1/2836
See application file for complete search history.

(56) References Cited

U.S. PATENT DOCUMENTS

| | | | | | |
|---|---|---|---|---|---|
| 2,144,964 | A | * | 1/1939 | De Falco | F16H 1/006 74/411 |
| 3,315,546 | A | * | 4/1967 | Fritsch | F16H 1/2836 475/346 |
| 3,397,589 | A | * | 8/1968 | Moore | F16H 57/02004 74/432 |
| 9,677,401 | B1 | * | 6/2017 | Alsubaih | F01C 21/08 |

(Continued)

FOREIGN PATENT DOCUMENTS

| | | |
|---|---|---|
| KR | 2023-0013552 A | 1/2023 |
| KR | 2023-0140062 A | 10/2023 |

(Continued)

*Primary Examiner* — Ernesto A Suarez
*Assistant Examiner* — Lillian T Nguyen
(74) *Attorney, Agent, or Firm* — MCDONNELL BOEHNEN HULBERT & BERGHOFF LLP (57) ABSTRACT

A gear train includes at least four gears sequentially engaged, multiple links configured to support the rotation shafts of the gears, and pins configured to fix the rotation shafts of the gears to the link, wherein the pins are installed such that, among the rotation shafts of the gears, two non-adjacent rotation shafts have both ends fixed to the link and one of adjacent rotation shafts has only one end fixed to the link.

20 Claims, 10 Drawing Sheets

(56) References Cited

U.S. PATENT DOCUMENTS

| 11,571,966 B1 * | 2/2023 | Park | B60K 17/046 |
| 2020/0003277 A1 * | 1/2020 | Sardes | F16H 7/02 |
| 2023/0020023 A1 * | 1/2023 | Park | B60K 7/0007 |

FOREIGN PATENT DOCUMENTS

| KR | 2023-0140063 A | 10/2023 |
| KR | 2023-0140064 A | 10/2023 |
| KR | 2023-0140065 A | 10/2023 |

* cited by examiner

|   |        | First intermediate gear | Joint gear | Second intermediate gear | Final gear |
|---|--------|-------------------------|------------|--------------------------|------------|
| 1 | Top    | O | × | O | × |
|   | Bottom | O | O | O | O |
| 2 | Top    | O | × | O | O |
|   | Bottom | O | O | O | × |
| 3 | Top    | O | O | O | × |
|   | Bottom | O | × | O | O |
| 4 | Top    | O | O | O | O |
|   | Bottom | O | × | O | × |
| 5 | Top    | O | O | O | O |
|   | Bottom | × | O | × | O |
| 6 | Top    | × | O | × | O |
|   | Bottom | O | O | O | O |
| 7 | Top    | × | O | O | O |
|   | Bottom | O | O | × | O |
| 8 | Top    | O | O | × | O |
|   | Bottom | × | O | O | O |

LINKAGE STRUCTURE AND UNIVERSAL DRIVING DEVICE USING SAME

CROSS REFERENCE TO RELATED APPLICATIONS

This application is based on and claims priority under 35 U.S.C. § 119 to Korean Patent Application No. 10-2023-0124132, filed on Sep. 18, 2023, in the Korean Intellectual Property Office, the disclosure of which is herein incorporated by reference in its entirety.

BACKGROUND

1. Field

The present disclosure relates to a linkage structure in which links are connected to be relatively rotatable with respect to each other.

2. Description of the Prior Art

One reliable configuration for power transmission without slipping between a drive shaft and a driven shaft is achieved by connecting the drive shaft and the driven shaft with a gear.

Power transmission between the drive shaft and the driven shaft which are positioned apart can be smoothly and stably performed by connecting the drive shaft and the driven shaft with a gear train including a series of gears.

Meanwhile, a configuration is needed to ensure stable and smooth power transmission even in situations where the distance between the drive shaft and the driven shaft continuously changes.

The foregoing described as the background art is intended merely to aid in the understanding of the background of the present disclosure, and is not intended to mean that the present disclosure falls within the purview of the related art already known to those skilled in the art.

SUMMARY

An aspect of the present disclosure is to provide a linkage structure that can continuously maintain a stable and smooth power transmission state in a situation where the distance between the drive shaft and the driven shaft changes.

Another aspect of the present disclosure is to provide a universal driving device that can be regarded as a planetary gear device equipped with the linkage structure as described above, to ensure easy assembly of the universal driving device and smooth and stable power transmission performance.

A linkage structure of the present disclosure to achieve the above-mentioned purpose includes a gear train including at least four gears sequentially engaged, multiple links configured to support the rotation shafts of the gears, and a pin configured to fix the rotation shafts of the gears to the link. The pin is installed such that, among the rotation shafts of the gears, two non-adjacent rotation shafts have both ends fixed to the link and one of adjacent rotation shafts has only one end fixed to the link.

The rotation shafts of the gears constituting the gear train may be formed by alternately arranging a rotation shaft having both ends fixed to the link with the pins and a rotation shaft having only one end fixed to the link with the pin.

The link may include at least two links connected to be relatively rotatable about the rotation shaft of one of the gears.

A gear having a rotation shaft to which the two links are connected to be relatively rotatable is a joint gear, and when only one end of the rotation shaft of the joint gear is fixed to the link with the pin, the rotation shafts of the gears connected to the join gear disposed therebetween may have both ends fixed to the link with the pins.

A gear having a rotation shaft to which the two links are connected to be relatively rotatable is a joint gear, and when both ends of the rotation shaft of the joint gear are fixed to the link with the pins, one of the rotation shafts of the gears connected to the joint gear may have both ends fixed to the link with the pins.

When only one end of the rotation shaft to which the two links are connected to be relatively rotatable is fixed to the link with the pin, at least one of the rotation shafts of the gears for every two links may have both ends fixed with the pins.

When both ends of the rotation shaft to which the two links are connected to be relatively rotatable are fixed to the link with the pins, only one of the two links may be fixed to both ends of one of the rotation shafts of the gears with the pin.

The links may be arranged in pairs at both ends of the gears.

The gear train may be installed to implement a continuous power transmission state between a sun gear and a ring gear in a planetary gear device equipped with the sun gear and the ring gear which form a variable inter-axis distance therebetween.

First ends of the multiple links may be installed to support the rotation shaft of the sun gear such that one end of the gear train is engaged with the sun gear; and second ends of the multiple links may be installed to support the rotation shaft of the final gear forming the other end of the gear train.

The rotation shaft of the final gear may be supported by a carrier constrained in relative motion with the ring gear.

The multiple links may include a first link and a second link connected to be relatively rotatable with respect to each other; a gear having a rotation shaft configured to support the first link and the second link to be relatively rotatable may be a joint gear; and the gear train may include a first intermediate gear connecting the sun gear and the joint gear, a second intermediate gear connecting the joint gear and a final gear, the joint gear, and the final gear.

The number of teeth of the sun gear, joint gear, and final gear may all be configured to be the same.

A universal driving device according to the present disclosure includes a ring gear, a sun gear having a variable inter-axis distance with respect to the rotation shaft of the ring gear, a gear train configured to connect the sun gear and the ring gear, and multiple links configured to accommodate the change in the inter-axis distance between the sun gear and the ring gear, and connected to be relatively rotatable with respect to each other to continuously maintain the power transmission state between the sun gear and the ring gear, the multiple links supporting the rotation shafts of gears constituting the gear train. The rotation shafts of the gears are formed by alternately arranging a rotation shaft having both ends fixed to the link and a rotation shaft having only one end fixed to the link along a power transmission path of the gear train.

The link may include a first link, one end of which supports the rotation shaft of the sun gear, and a second link rotatably connected to the first link.

The gear train may include a first intermediate gear engaged with the sun gear, a joint gear engaged with the first intermediate gear, the rotation shaft of the joint gear serving as a rotation shaft between the first link and the second link, a second intermediate gear engaged with the joint gear, and a final gear engaged with the second intermediate gear and engaged with the ring gear.

The rotation shaft of the first intermediate gear and the rotation shaft of the joint gear may be fixed to the first link, the rotation shaft of the joint gear, the rotation shaft of the second intermediate gear, and the rotation shaft of the final gear may be fixed to the second link, and the rotation shaft of the final gear may be supported by a carrier constrained in relative motion with the ring gear.

The number of teeth of each of the sun gear and the joint gear may be the same as the number of teeth of the final gear.

Only one end of the rotation shaft of the joint gear may be fixed to the link with a pin; each of the rotation shaft of the first intermediate gear and the rotation shaft of the second intermediate gear may have both ends fixed to the link with pins; and only one end of the final gear may be fixed to the link with a pin.

Each of the rotation shaft of the joint gear and the rotation shaft of the final gear may have both ends fixed to the link with pins; and each of the rotation shaft of the first intermediate gear and the rotation shaft of the second intermediate gear may have only one end fixed to the link with a pin.

The present disclosure provides a linkage structure that can continuously maintain a stable and smooth power transmission state in a situation where the distance between the drive shaft and the driven shaft varies.

In addition, the present disclosure provides a universal driving device that can be regarded as a planetary gear device equipped with the linkage structure as described above, to ensure easy assembly of the universal driving device and smooth and stable power transmission performance.

BRIEF DESCRIPTION OF THE FIGURES

The above and other aspects, features and advantages of the present disclosure will be more apparent from the following detailed description taken in conjunction with the accompanying drawings, in which.

DETAILED DESCRIPTION

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 1:
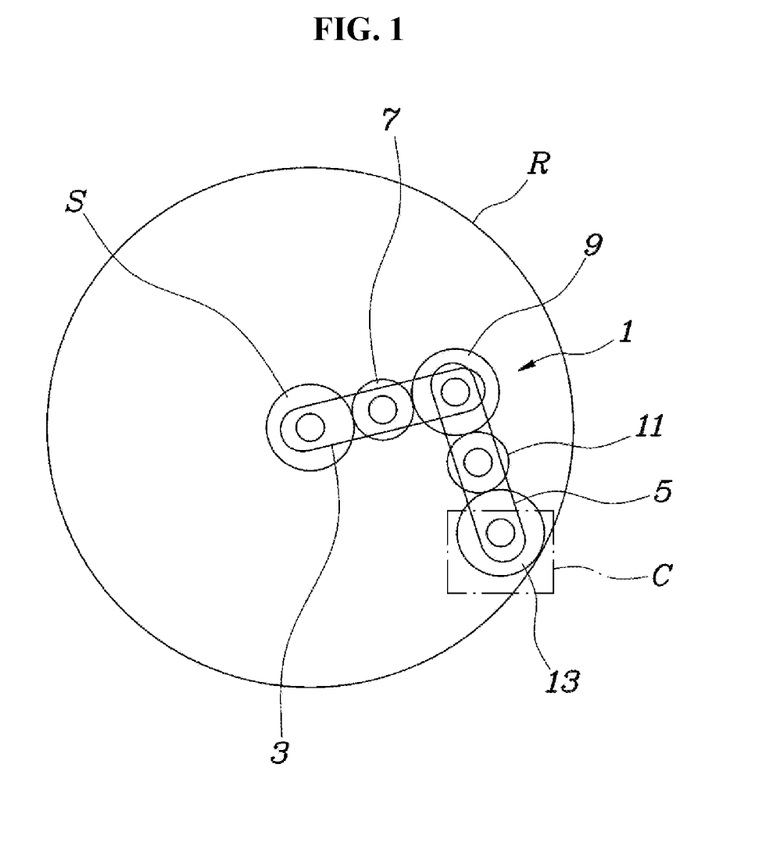
FIG. 1 illustrates a basic configuration of a universal driving device according to the present disclosure.
Figure 2:
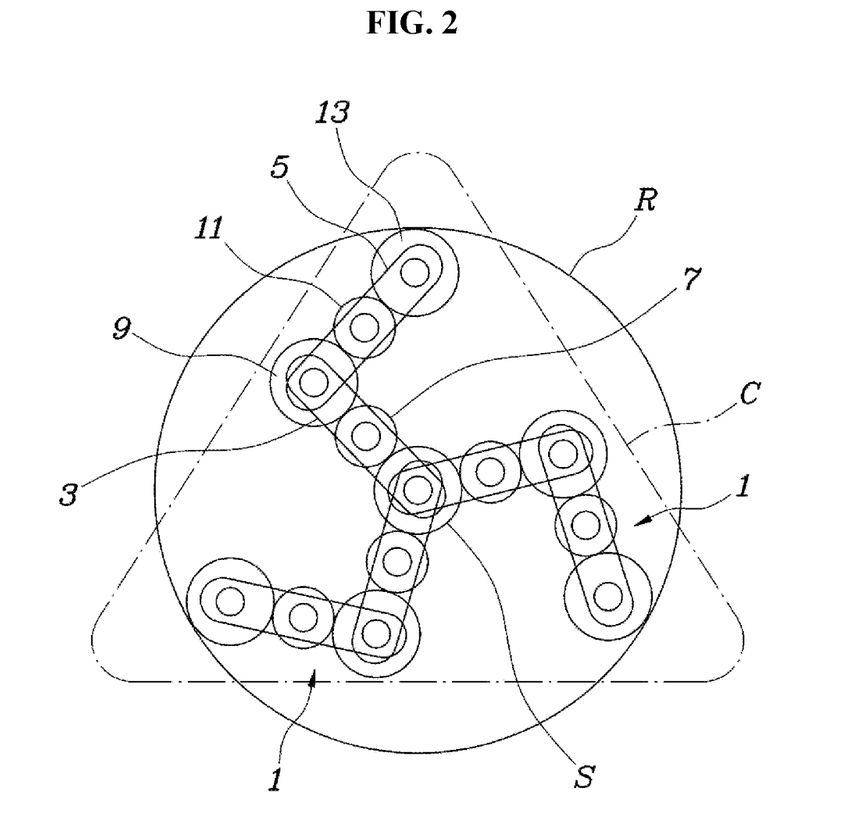
FIG. 2 illustrates an embodiment of a universal driving device according to the present disclosure.

For reference, FIG. 1 illustrates a basic configuration of a universal driving device according to the present disclosure, and shows an example with one gear train 1 to explain the principle of the universal driving device, and FIG. 2 shows an example with three gear trains 1.

Referring to FIGS. 1 to 10, the universal driving device (U) according to the present disclosure includes a ring gear (R), a sun gear (S) installed to have a variable inter-axis distance with respect to the rotation shaft of the ring gear (R), a gear train 1 connecting the sun gear (S) and the ring gear (R), and multiple links configured to accommodate a change in the inter-axis distance between the sun gear (S) and the ring gear (R), and connected to be relatively rotatable with respect to each other to continuously maintain the power transmission state between the sun gear (S) and the ring gear (R), the multiple links supporting the rotation shafts of gears constituting the gear train 1.

The rotation shafts of the gears are formed by alternately arranging a rotation shaft having both ends fixed to the link and a rotation shaft having only one end fixed to the link along the power transmission path of the gear train 1.

Therefore, excellent workability of the assembly work of coupling the gears constituting the gear train 1 to the link can be ensured, and a stable and smooth operating state of the gears constituting the gear train 1 can be secured.

When both ends of the rotation shafts of the gears constituting the gear train 1 are fixed to the link, there is a high probability that easy assembly of the gears substantially becomes difficult, and after assembly, an interlock situation occurs, making smooth rotation impossible, due to tolerances caused by the location or size of the hole formed for inserting the rotation shafts into the link, and the location or size of the pinhole for inserting a pin for fixing the rotation shafts to the link.

However, as in the present disclosure, when the rotation shafts of the gears constituting the gear train 1 are formed by alternately arranging a structure having both ends fixed to the link and a structure having only one end fixed to the link, the assembly failures and interlock situations, as described above, may be prevented, so that smooth and easy assembly of the universal driving device (U) and smooth and reliable power transmission performance can be ensured.

In the present embodiment, the link includes a first link 3, one end of which supports the rotation shaft of the sun gear (S), and a second link 5 rotatably connected to the first link 3.

For reference, it is understood that the "linkage structure" of the present disclosure refers to a structure in which gears constituting the gear train 1 and having a rotation shaft fixed to the links, the first link 3, and the second link 5 are connected to each other.

In the present embodiment, the gear train 1 includes a first intermediate gear 7 engaged with the sun gear (S), a joint gear 9 engaged with the first intermediate gear 7, the rotation shaft of the joint gear 9 serving as a rotation shaft between the first link 3 and the second link 5, a second intermediate gear 11 engaged with the joint gear 9, and a final gear 13 engaged with the second intermediate gear 11 and engaged with the ring gear (R).

The rotation shaft of the first intermediate gear 7 and the rotation shaft of the joint gear 9 are fixed to the first link 3, the rotation shaft of the joint gear 9, the rotation shaft of the second intermediate gear 11, and the rotation shaft of the final gear 13 are fixed to the second link 5, and the rotation shaft of the final gear 13 is supported by a carrier (C) constrained in relative motion with the ring gear (R).

The number of teeth of each of the sun gear (S) and the joint gear 9 is formed to be the same as the number of teeth of the final gear 13.

That is, the sun gear (S), the joint gear 9, and the final gear 13 all have the same number of teeth.

As described above, when the sun gear (S), the joint gear 9, and the final gear 13 have the same number of teeth, the relative phase of the sun gear (S) and ring gear (R) remains constant with respect to the relative motion of the rotation shafts of the sun gear (S) and the ring gear (R) in the up, down, left, and right directions.

Figure 3:
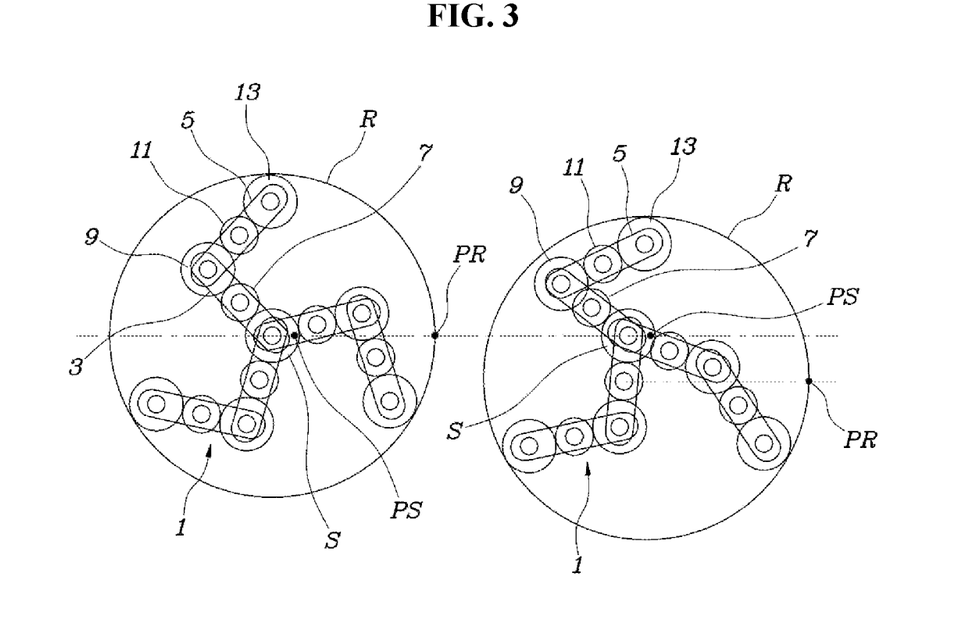
FIG. 3 illustrates a state in which a ring gear is relatively lowered, compared to the state of FIG. 2.
Figure 4:
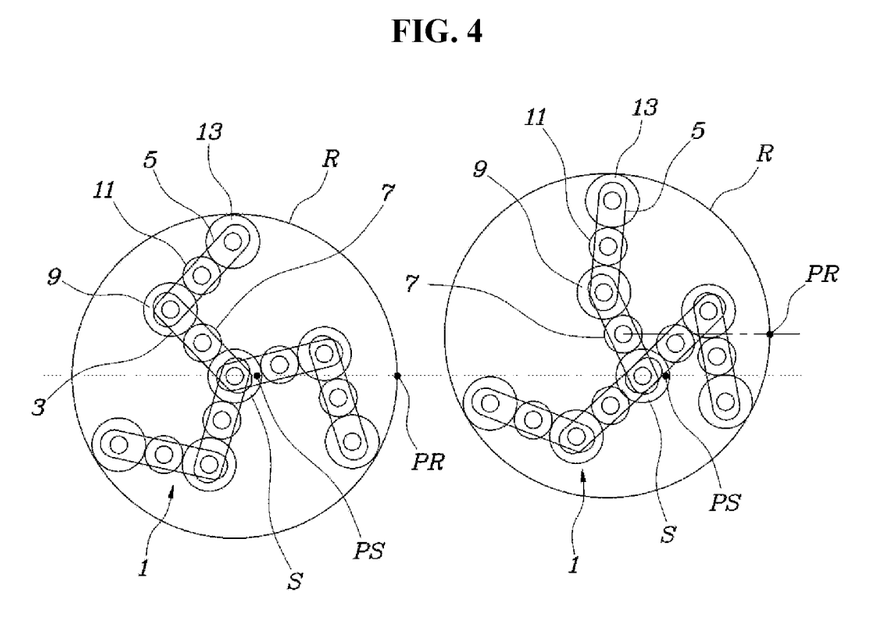
FIG. 4 illustrates a state in which the ring gear is relatively raised, compared to the state in FIG. 2.

As shown in FIGS. 3 and 4, the relative phase of the sun gear (S) and the ring gear (R), which remains constant with respect to the relative motion thereof, can be expressed as the rotational phase of the points (PS, PR) respectively marked on the sun gear (S) and ring gear (R), which remains constant even when the ring gear (R) moves up and down or moves left and right with respect to the sun gear (S).

That is, when the sun gear (S), the joint gear 9, and the final gear 13 have the same number of teeth, relative rotation between the sun gear (S) and ring gear (R) occurring due to a change in the inter-axis distance between the sun gear (S) and ring gear (R) is prevented.

Therefore, the power transmitted from the sun gear (S) is transmitted to the ring gear (R) at a constant speed, regardless of the change in the inter-axis distance between the sun gear (S) and the ring gear (R). Accordingly, when the power generated by a motor (M) is transmitted from the sun gear (S) to the wheel (W) via the ring gear (R) in a vehicle to which the universal driving device (U) of the present disclosure is applied, stable control of output torque through the motor (M) is achieved since the phase of the motor (M) connected to the sun gear (S) and the phase of the wheel (W) connected to the ring gear (R) remain unchanged even if the ring gear (R) and the wheel (W) move up and down or move left and right with respect to the rotation shaft of the motor (M) or sun gear (S), ensuring stable driving of the vehicle.

If any one of the sun gear (S), the joint gear 9, and the final gear 13 has a different number of teeth, failing to satisfy the condition described above, relative rotation between the sun gear (S) and ring gear (R) may occur since the ring gear (R) and wheel (W) may move up, down, left and right with respect to the sun gear (S) and motor (M) even if the motor (M) rotates at a constant speed as described above. As a result, the vehicle may experience vibration, that is, surging, depending on the vehicle's driving direction.

Figure 5:
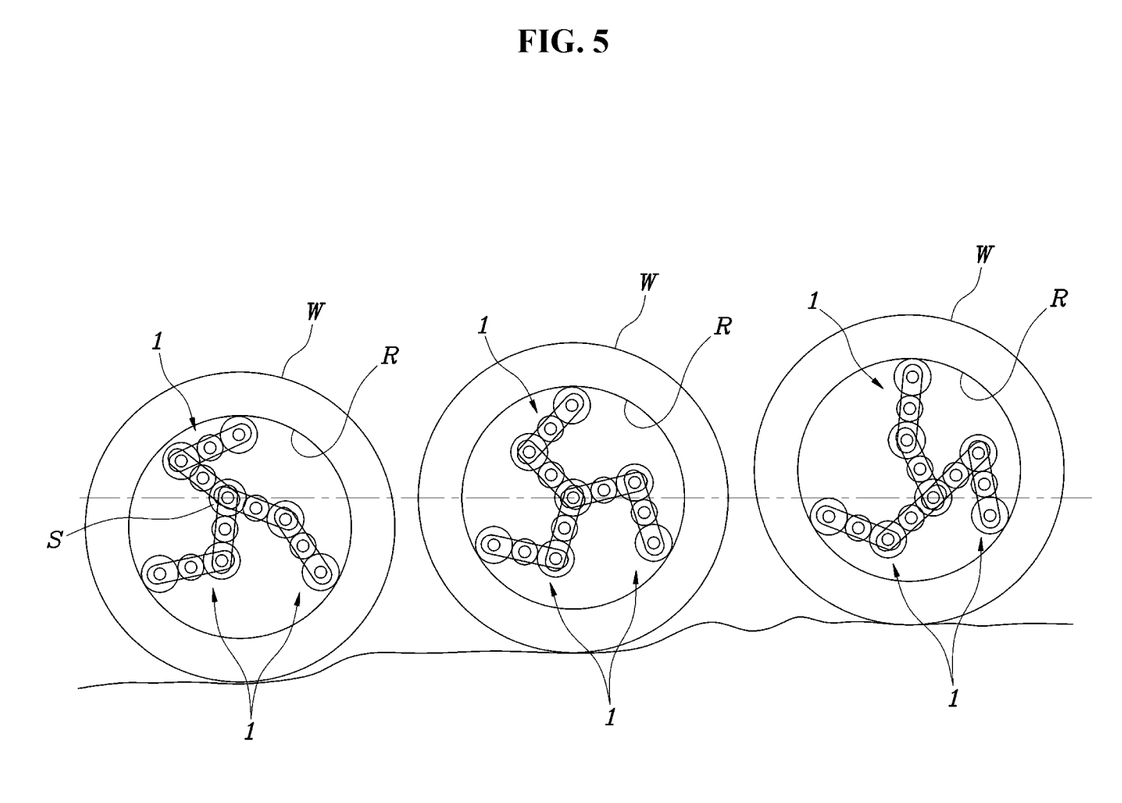
FIG. 5 illustrates an example of applying the embodiment of FIG. 2 to a vehicle, and compares the raising and lowering of ring gears and wheels with respect to sun gears depending on changes in a road surface.

FIG. 5 depicts an example the embodiment of FIG. 2 applied to a vehicle, showing a comparison of the sun gear (S) and ring gear (R) positions relative to changes in the road surface. In this illustration, the central wheel is used as a reference point: on the left side, the road surface is relatively lower, resulting in the wheel being in a lowered position, while on the right side, the road surface is relatively higher, causing the wheel to be in a raised position. It is noteworthy that despite these changes in the wheel's position, the height of the sun gear (S) remains consistently constant.

Figure 6:
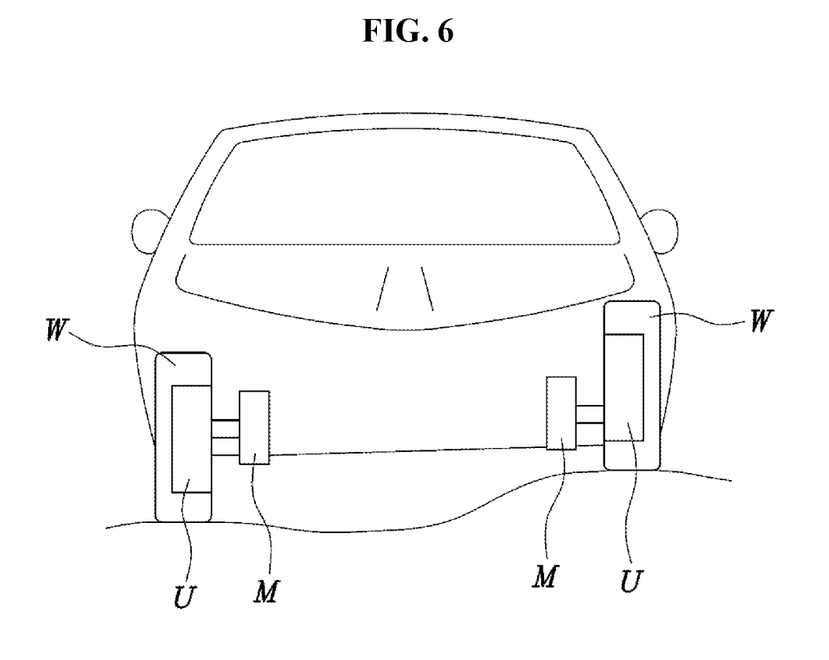
FIG. 6 illustrates an example of applying a universal driving device according to the present disclosure to a vehicle.

FIG. 6 illustrates that the universal driving device (U) of the present disclosure can be used as a driving device for a vehicle by connecting the rotation shaft of the motor (M) to the sun gear (S), and connecting the wheel (W) to the ring gear (R).

In this case, the power input to the sun gear (S) is decelerated and output to the ring gear (R), thereby ensuring excellent uphill and acceleration performance of the vehicle.

In addition, the motor (M) may be installed separately outside the wheel (W), which is subject to severe shock and vibration, rather than being installed inside the wheel (W), thereby improving the durability of the motor (M) and securing excellent riding comfort due to the reduced unsprung mass of the vehicle, compared to the in-wheel motor driving device.

In addition, as described above, constant power transmission is possible while allowing the ring gear (R) connected to the wheel (W) to be raised and lowered with respect to the sun gear (S) connected to the power source, so that continuous power transmission from the power source is possible in response to the up-down and left-right movements of the wheel (W) without using conventional constant velocity joints, etc. Accordingly, the space between the power source and the wheels (W) is reduced, ultimately making it possible to manufacture a vehicle with excellent utilization of the space between the left wheel (W) and the right wheel (W).

Figure 7:
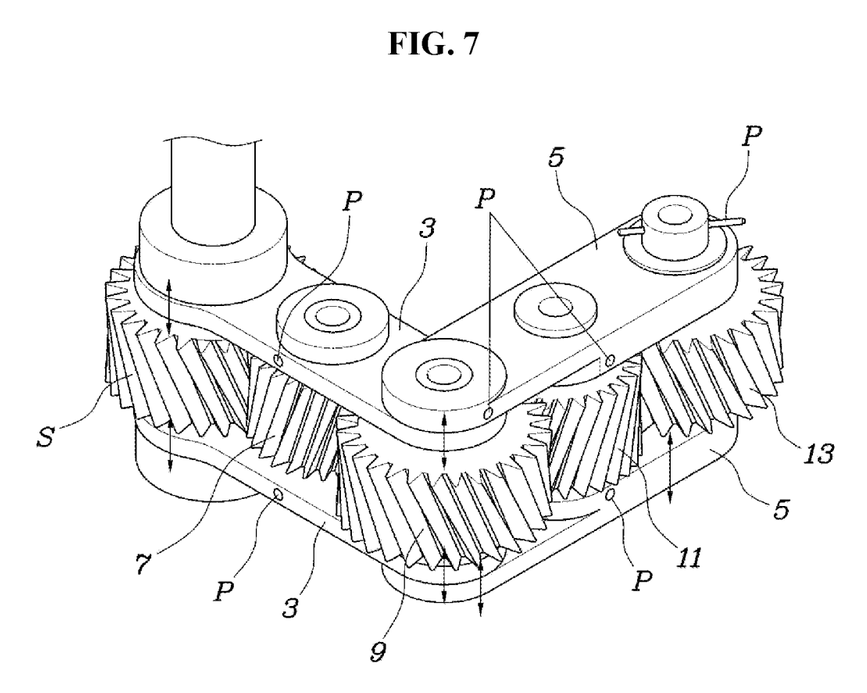
FIG. 7 illustrates a linkage structure applicable to a universal driving device according to the present disclosure.
Figure 8:
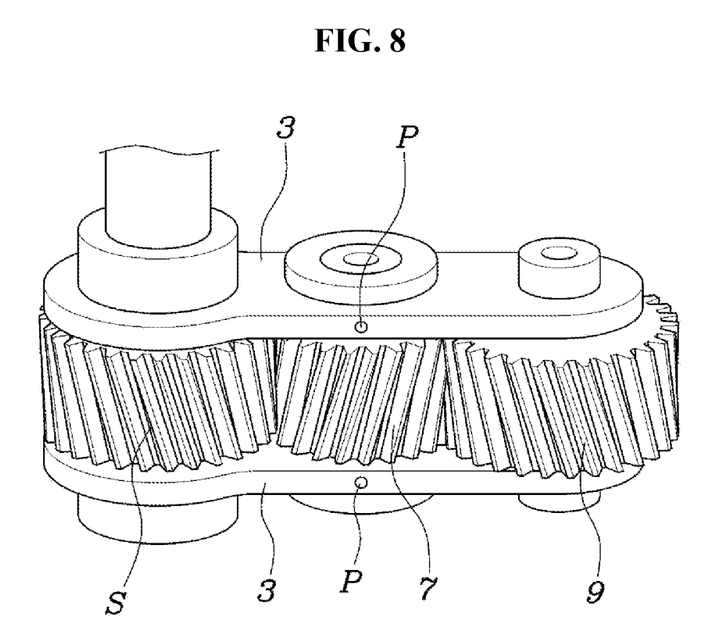
FIG. 8 illustrates the first link and gears of FIG. 7.
Figure 9:
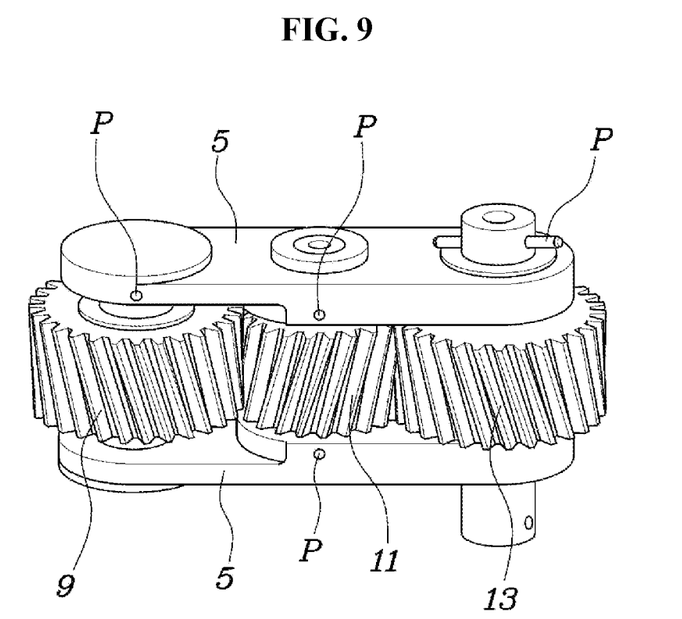
FIG. 9 illustrates the second link and gears of FIG. 7.

FIG. 7 illustrates a linkage structure that can be used in the universal driving device (U) as described above, and the separated linkage structure can be illustrated as shown in FIGS. 8 and 9.

FIG. 8 illustrates the first link 3 in which the sun gear (S), the first intermediate gear 7, and the joint gear 9 are sequentially engaged, and FIG. 9 illustrates the second link 5 in which the joint gear 9, the second intermediate gear 11, and the final gear 13 are sequentially engaged.

For reference, the joint gear 9 is illustrated in both FIGS. 8 and 9 for convenience of understanding, and the final gear 13 is engaged with the ring gear (R) in the universal driving device (U).

In the example of the linkage structure of FIGS. 7 to 9, only the upper end of the rotation shaft of the joint gear 9 is fixed to the second link 5 with a pin (P), both ends of the rotation shaft of the first intermediate gear 7 are fixed to the first link 3 with pins (P), and both ends of the rotation shaft of the second intermediate gear 11 are fixed to the second link 5 with pins (P).

Here, only the upper end of the rotation shaft of the final gear 13 is fixed to the carrier (C) with a pin (P). However, FIGS. 7 and 9 illustrate only the pin (P) connected to the upper end of the rotation shaft of the final gear 13 with the carrier (C) omitted therein.

The rotation shaft of the final gear 13 may be fixed to the second link 5 with a pin (P) instead of being fixed to the carrier (C) with a pin (P) as described above.

For reference, both ends of the rotation shaft of the sun gear (S) in this case are not fixed to the first link (3) with pins (P).

Accordingly, in the linkage structure of FIG. 7, both ends of the rotation shaft of the first intermediate gear 7 are fixed to the link, only the upper end of the rotation shaft of the joint gear 9 is fixed to the link, both ends of the rotation shaft of the second intermediate gear 11 are fixed to the link, and the upper end of the final gear 13 is fixed to the carrier (C), so that rotation shafts of the gears constituting the gear train 1 are formed by alternately arranging a shaft having both ends fixed to the link and a shaft having one end fixed to the link.

In FIG. 7, the up and down arrows displayed on a portion of the link express the possibility of movement in the direction of the rotation shaft of the gear because the link is not bound to the rotation shaft of the gear in the portion, and accordingly, the movement possibility structurally secured between the gear and the link provides smooth and easy assembly and smooth and stable operation of the linkage structure, as described above.

Figure 10:
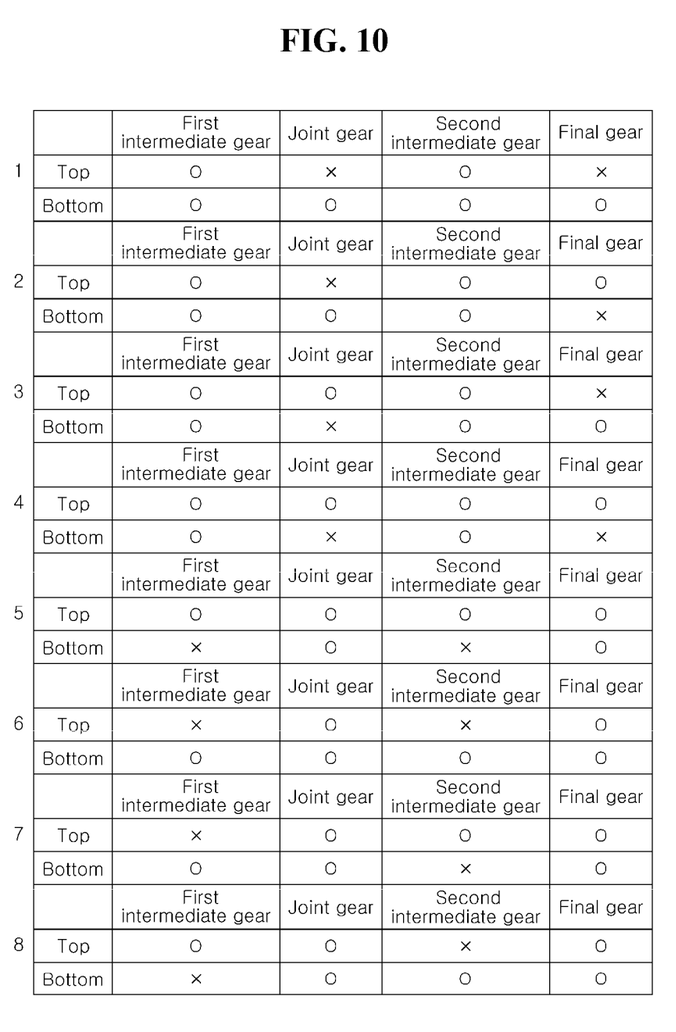
FIG. 10 is a Table summarizing various examples in which the rotation shafts of gears constituting a linkage structure of the present disclosure are fixed to a link.

FIG. 10 is a Table summarizing various examples in which the rotation shafts of gears constituting a linkage structure of the present disclosure are fixed to a link.

For example, the example of the linkage illustrated in FIGS. 7 to 9 corresponds to the 4th example in FIG. 10.

Referring to FIG. 10, as shown in the 1st to 4th examples, only one end of the rotation shaft of the joint gear 9 may be fixed to the link with a pin (P); each of the rotation shaft of the first intermediate gear 7 and the rotation shaft of the second intermediate gear 11 may have both ends fixed to the link with pins (P); and only one end of the rotation shaft of the final gear 13 may be fixed to the link with a pin (P).

In addition, as shown in 5th to 8th examples, each of the rotation shaft of the joint gear 9 and the rotation shaft of the final gear 13 may have both ends fixed to the link with pins (P); and each of the rotation shaft of the first intermediate gear 7 and the rotation shaft of the second intermediate gear may have only one end fixed to the link with a pin (P).

For reference, the links are arranged in pairs at both ends of the gears, and as illustrated in FIG. 8, the first link 3 may represent both links placed on both upper and lower ends of the sun gear (S), the first intermediate gear 7, and the joint gear 9, and as illustrated in FIG. 9, the second link 5 may represent both links placed on both upper and lower ends of the joint gear 9, the second intermediate gear 11, and the final gear 13.

In addition, in FIG. 10, the mark O in a top section indicates that the rotation shaft of the gear is fixed to the upper link with a pin (P), the mark O in a bottom section indicates that the rotation shaft of the gear is fixed to the lower link with a pin (P), the mark X in a top section indicates that the rotation shaft of the gear is not fixed to the upper link, and the mark X in a bottom section indicates that the rotation shaft of the gear is not fixed to the lower link.

The linkage structure of the present disclosure to which is applicable to the universal driving device (U) as described above may include: a gear train 1 including at least four gears sequentially engaged; multiple links configured to support the rotation shafts of the gears; and a pin (P) configured to fix the rotation shafts of the gears to the link.

The pin (P) may be installed such that, among the rotation shafts of the gears, two non-adjacent rotation shafts have both ends fixed to the link and one of adjacent rotation shafts has only one end fixed to the link.

That is, the rotation shafts of the gears constituting the gear train 1 are formed by alternately arranging e a shaft having both ends fixed to the link with the pins (P) and a shaft having only one end fixed to the link with the pin (P).

The link comprises at least two links connected to be relatively rotatable about the rotation shaft of any one of the gears.

The 1st to 4th examples of FIG. 10 represent that the gear having a rotation shaft to which the two links are connected to be relatively rotatable is the joint gear 9; and when only one end of the rotation shaft of the joint gear 9 is fixed to the link with the pin (P), the rotation shafts of the gears connected to the joint gear 9 disposed therebetween have both ends connected to the link with the pins (P).

That is, when only one end of the rotation shaft to which the two links are connected to be relatively rotatable is fixed to the link with the pin (P), at least one of the rotation shafts of the gears for every two links has both ends fixed with the pins (P).

The 5th to 8th examples of FIG. 10 represent that the gear having a rotation shaft to which the two links are connected to be relatively rotatable is the joint gear 9; and when both ends of the rotation shaft of the joint gear 9 are fixed to the link with the pins (P), one of the rotation shafts of the gears connected to the joint gear 9 has both ends fixed to the link with the pins (P).

That is, when both ends of the rotation shaft to which the two links are connected to be relatively rotatable are fixed to the link with the pins (P), only one of the two links is fixed to both ends of one of the rotation shafts of the gears with the pins (P).

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:
1. A linkage structure comprising:
a gear train comprising at least four gears sequentially engaged;
a plurality of links configured to support rotation shafts of each of the at least four gears;
pins configured to fix the rotation shafts of each of the at least four gears to the link;

wherein the pins are installed such that, among the rotation shafts of each of the at least four gears, two non-adjacent rotation shafts have both ends fixed to one of the plurality of links, and one of adjacent rotation shafts has only one end fixed to one of the plurality of links.

2. The linkage structure of claim 1, wherein the rotation shafts of each of the at least four gears constituting the gear train are formed by alternately arranging a rotation shaft having both ends fixed to the one of the plurality of links with the pins, and the rotation shaft having only one end fixed to the one of the plurality of links with the pins.

3. The linkage structure of claim 1, wherein the plurality of links comprise at least two links connected to be rotatable about a rotation shaft of one of the at least four gears.

4. The linkage structure of claim 3, wherein one of the at least four gears having a rotation shaft to which two of the plurality of links are connected to be rotatable is a joint gear; and
when only one end of the rotation shaft of the joint gear is fixed to the one of the plurality of links with the pins, rotation shafts of the at least four gears connected to the joint gear disposed therebetween have both ends fixed to the one of the plurality of links with the pins.

5. The linkage structure of claim 3, wherein one of the at least four gears having the rotation shaft to which two of the plurality of links are connected to be rotatable is a joint gear; and
when both ends of the rotation shaft of the joint gear are fixed to the one of the plurality of links with the pins, one of rotation shafts of the at least four gears connected to the joint gear has both ends fixed to the one of the plurality of links with the pins.

6. The linkage structure of claim 3, wherein when only one end of a rotation shaft among the rotation shafts of each of the at least four gears to which two of the plurality of links are connected to be rotatable is fixed to the one of the plurality of links with the pins, at least one of rotation shafts of the at least four gears for every two of the plurality of links has both ends fixed with the pins.

7. The linkage structure of claim 3, wherein when both ends of a rotation shaft among the rotation shafts of each of the at least four gears to which two of the plurality of links are connected to be rotatable are fixed to the one of the plurality of links with the pins, only one of the two of the plurality of links is fixed to both ends of one of the rotation shafts of one of the at least four gears with the pins.

8. The linkage structure of claim 3, wherein the plurality of links are arranged in pairs at both ends of the at least four gears.

9. The linkage structure of claim 1, wherein the gear train is configured to implement a continuous power transmission state between a sun gear and a ring gear in a planetary gear device equipped with the sun gear and the ring gear which form a variable inter-axis distance therebetween.

10. The linkage structure of claim 9, wherein first ends of each of the plurality of links are configured to support a rotation shaft of the sun gear such that one end of the gear train is engaged with the sun gear; and
second ends of each of the plurality of links are configured to support a rotation shaft of a final gear forming an other end of the gear train.

11. The linkage structure of claim 10, wherein the rotation shaft of the final gear is supported by a carrier constrained in relative motion with the ring gear.

12. The linkage structure of claim 11, wherein the plurality of links comprise a first link and a second link connected to be rotatable with respect to each other;
a gear having a rotation shaft configured to support the first link and the second link to be rotatable is a joint gear; and
the gear train comprises a first intermediate gear connecting the sun gear to the joint gear, a second intermediate gear connecting the joint gear to the final gear, the joint gear, and the final gear.

13. The linkage structure of claim 12, wherein a number of teeth of the sun gear, joint gear, and final gear are identical.

14. A universal driving device comprising:
a ring gear;
a sun gear configured to have a variable inter-axis distance with respect to a rotation shaft of the ring gear;
a gear train configured to connect the sun gear and the ring gear; and
a plurality of links configured to accommodate a change in an inter-axis distance between the sun gear and the ring gear, and connected to be rotatable with respect to each other to continuously maintain a power transmission state between the sun gear and the ring gear, the plurality of links supporting rotation shafts of gears constituting the gear train;
wherein the rotation shafts of the gears constituting the gear train are formed by alternately arranging a rotation shaft among the rotation shafts of the gears having both ends fixed to one of the plurality of links and a rotation shaft among the rotation shafts of the gears having only one end fixed to one of the plurality of links along a power transmission path of the gear train.

15. The universal driving device of claim 14, wherein the plurality of links comprise:
a first link, one end of which supports a rotation shaft of the sun gear; and
a second link rotatably connected to the first link.

16. The universal driving device of claim 15, wherein the gear train comprises:
a first intermediate gear engaged with the sun gear;
a joint gear engaged with the first intermediate gear, a rotation shaft of the joint gear serving as a rotation shaft between the first link and the second link;
a second intermediate gear engaged with the joint gear; and
a final gear engaged with the second intermediate gear and engaged with the ring gear.

17. The universal driving device of claim 16, wherein a rotation shaft of the first intermediate gear and a rotation shaft of the joint gear are fixed to the first link;
the rotation shaft of the joint gear, a rotation shaft of the second intermediate gear, and a rotation shaft of the final gear are fixed to the second link; and
the rotation shaft of the final gear is supported by a carrier constrained in relative motion with the ring gear.

18. The universal driving device of claim 17, wherein a number of teeth of each of the sun gear and the joint gear is identical to a number of teeth of the final gear.

19. The universal driving device of claim 18, wherein only one end of the rotation shaft of the joint gear is fixed to one of the plurality of links with a pin;
each of the rotation shaft of the first intermediate gear and the rotation shaft of the second intermediate gear has both ends fixed to the one of the plurality of links with pins; and only one end of the final gear is fixed to one of the plurality of links with the pin.

20. The universal driving device of claim 18, wherein each of the rotation shaft of the joint gear and the rotation shaft of the final gear has both ends fixed to one of the plurality of links with pins; and each of the rotation shaft of the first intermediate gear and the rotation shaft of the second intermediate gear has only one end fixed to one of the plurality of links with a pin.

* * * * *